United States Patent [19]

Bluen et al.

[11] Patent Number: 5,598,625
[45] Date of Patent: Feb. 4, 1997

[54] METHOD FOR ASSEMBLY OF RADIAL MAGNET VOICE COIL ACTUATORS

[76] Inventors: Jeff Bluen, 4145 Laurel Grove Ave., Studio City, Calif. 91604; Emanuel Leibzon, 4750 Corbin Ave., Tarzana, Calif. 91356

[21] Appl. No.: 140,231

[22] Filed: Oct. 20, 1993

Related U.S. Application Data

[63] Continuation-in-part of Ser. No. 740,068, Aug. 5, 1991, Pat. No. 5,321,762.

[51] Int. Cl.$^6$ .................................................. H04R 31/00
[52] U.S. Cl. .......................... 29/594; 29/281.5; 29/467; 29/596; 29/602.1; 29/607; 29/760; 29/609.1
[58] Field of Search .......................... 29/594, 596, 598, 29/602.1, 607, 609.1, 732, 736, 760, 281.5, 467; 310/42, 45, 156; 156/293, 294, 297

[56] References Cited

U.S. PATENT DOCUMENTS

| | | | |
|---|---|---|---|
| 2,306,291 | 12/1942 | Alons | 29/594 |
| 3,555,651 | 1/1971 | Latussek et al. | 29/736 |
| 4,182,027 | 1/1980 | Benezech | 29/598 |
| 4,974,312 | 12/1990 | Yokoyama et al. | 29/602.1 |

*Primary Examiner*—Carl E. Hall

[57] ABSTRACT

A method of assembling an annular magnet and a pole piece in a chamber of a cylindrical core at a predetermined height is disclosed. The magnet assembly tool has a first portion with a diameter of approximately the diameter of the chamber less the width of the annular magnet and a second portion with a diameter of approximately the width of the chamber. Therefore a gap is formed between the outer wall of the chamber and the first portion of the magnet assembly tool when the tool is inserted in the chamber. The annular magnet is positioned into the gap, and an adhesive is applied to adhere the magnet to the outer wall of the chamber. The pole piece is assembled using a pole piece assembly tool. The pole piece assembly tool has a head and an annular sleeve extending from the head. The annular sleeve of the tool is inserted into the chamber such that the outer surface of the annular sleeve is in contact with the magnet and the head of the device abuts the upper edge of the chamber. The pole piece is then inserted into the chamber and within the tool sleeve such that the pole piece is coaxially aligned within the cylindrical core.

10 Claims, 3 Drawing Sheets

METHOD FOR ASSEMBLY OF RADIAL MAGNET VOICE COIL ACTUATORS

RELATED APPLICATION DATA

The present application is a continuation-in-part of commonly owned, application, U.S. Ser. No. 07/740,068 filed on Aug. 5, 1991 for Voice Coil Actuator now U.S. Pat. No. 5,321,762.

FIELD OF THE INVENTION

The present invention relates generally to devices and methods for assembling voice coil actuators having annular radially oriented magnets and more particularly to novel devices and methods for bonding an annular radial magnet to a cylindrical core member and axially aligning a pole piece within the core.

BACKGROUND OF THE INVENTION

A known typical voice coil actuator is comprised of a core, an axially polarized cylindrical magnet, a base plate, a rod, and two pole pieces. The rod and the magnet are coaxially mounted on the base plate, such that the rod extends through the center of the magnet. The two pole pieces are coaxially mounted respective to the magnet and the rod. The first pole piece has an inner diameter less than the inner diameter of the cylindrical magnet and the second pole piece has an inner diameter greater than the diameter of the rod. Therefore, a gap remains between the facing sides of the pole pieces. A coil is coaxially suspended within the gap.

Referring now to FIG. 1, there is shown a novel voice coil actuator 10 assembled according to the principles of the present invention and disclosed in co-pending U.S. application No. 07/740,068, which is incorporated by reference herein. The actuator 10 includes a core member 12, a pole piece 14, a radially polarized magnet 16 and an electrical current conductive coil 18. The core member 12 and the pole piece 14 are preferably constructed from magnetic flux conductive material. The core member 12 is cylindrical and has an upper surface 20 with a continuous chamber 22 disposed in the upper surface. The chamber 22 has an outer first wall 24 having a predetermined chamber diameter. The pole piece 14 is preferably a cylindrical rod. The cylindrical rod is coaxially mounted in the chamber 22 and has a first surface 26 that forms an inner second wall 28 of the chamber 22.

The magnet 16 is disposed in intimate contact with the outer first wall 24 so that a gap 30 remains between the magnet 16 and the inner second wall 28. Alternatively, the magnet 16 could be mounted to the inner second wall 28 and spaced from the outer first wall 24. The magnet 16 is annular or cylindrical in shape and has radial polarization. Accordingly, the magnet 16 has a first face of a first magnetic polarity adjacent the outer first wall 24 and a second face of a second, opposite magnetic polarity facing the gap 30. The magnet 16 has a lower edge 32 spaced from the bottom wall 34 of the chamber 22 and an upper edge 36 coextensive with the upper surface 38 of the pole piece rod so that the magnetic flux is substantially confined normal from the second face of the magnet 16 across the gap 30 to the inner second wall 28. Since the second face is a pole of the magnet, the flux emanating from this pole will be continuous and uniform across the entire surface of the second face and be of the same intensity at the lower edge 32 and upper edge 36. The flux in the gap of the novel voice coil actuator 10 is therefore uniform along the height of the gap. This uniformity of flux is a significant advantage of the novel actuator 10 exhibits over the prior art actuators.

The magnet 16 may be of unitary cylindrical construction. The magnet 16 may also be constructed from a plurality of arc segments 40 (shown in FIG. 2) of radially polarized magnetic material. Each arc segment 40 may be bonded directly to the outer wall 24 to form the annular construction. It is also possible to approximate an annular radially polarized magnet by a plurality of flat magnet segments placed side by side on the outer wall 24. The gaps remaining between each flat segment would be filled with a flux defocuser, such as iron.

The spacing of the lower edge 32 from the bottom wall 34 is selected to be larger than the width of the gap 30 between the magnet 16 and the inner second wall 28. For fringing from the lower edge 32 toward the bottom wall 34 to occur, the fringing field would have an axial component and a radial component. By having the radial component travel a much shorter distance than the axial component, the resistance to the radial component is considerably less than the resistance to the axial component. Since the flux will follow a path of least resistance, these spacings will force the flux to stay radial in the gap and not fringe from the lower edge. The magnet 16 therefore is bonded to the outer wall 24 at a predetermined height in order to eliminate fringing.

Although the actuator 10 may be constructed as described in U.S. patent application Ser. No. 07/740,068, an improved method and devices for use in assembling the actuator 10 have been discovered. The new method and devices overcome several of the disadvantages of the previous method of assembling the actuator. The first disadvantage relates to bonding the radially polarized magnet to the outer wall of the chamber. The magnet ring must be coaxially aligned with the chamber axis. Also, after the magnet ring is positioned within the chamber, the entire circumference of the magnet ring outer surface must either be in contact with or in close relation to the outer surface of the chamber. An adhesive is then applied between the magnet ring and the chamber outer wall. If the magnet ring is not coaxially aligned within the chamber, a portion of the magnet ring may be in direct contact with the outer wall of the chamber, or spaced from the outer wall, and the adhesive cannot be properly applied.

Another disadvantage arises when a plurality of magnet segments are bonded to the outer wall to form an annular shaped magnet. This disadvantage is caused by the fact that the magnet segments repel each other. Therefore, after $N_{-1}$ segments are inserted into the chamber, the Nth magnet resists fitting into the chamber because the remaining $N_{-1}$ magnets are forcing themselves out into evenly spaced distances around the ring. Therefore, a new method and device for bonding the ring magnet or magnet segments to the outer wall surface of the chamber is desired.

Another disadvantage with assembling the above-described actuator is related to assembling the pole piece into the chamber. The magnet ring is bonded to the chamber wall before the pole piece is inserted into the chamber. As a result, when the pole piece is inserted into the chamber it is attracted off-axis by the magnet, and is not easily coaxially aligned within the chamber. Therefore, a need exists for an improved method and device for easily and accurately assembling the pole piece into the chamber of the core.

SUMMARY OF THE INVENTION

It is therefore an object of the present invention to provide a method and device for assembling a pole piece and an annular radially magnetized magnet into a cylindrical-shaped core of an actuator.

According to the present invention, an annular magnet and a pole piece are assembled into a chamber of a cylindrical core at a predetermined height utilizing a unique magnet assembly tool and pole piece assembly tool. The magnet assembly tool has a first portion with a diameter of approximately the diameter of the chamber less the width of the annular magnet and a second portion with a diameter of approximately the width of the chamber. Therefore, when the tool is inserted in the chamber, a gap is formed between the outer wall of the chamber and the first portion of the magnet assembly tool. The annular magnet is positioned into the gap, and an adhesive is applied to adhere the magnet to the outer wall of the chamber. The pole piece is assembled using the pole piece assembly tool having a head and an annular sleeve extending from the head. The annular sleeve of the tool is inserted into the chamber such that the outer surface of the annular sleeve is in contact with the magnet and the head of the device abuts the upper edge of the chamber. The pole piece is then inserted into the chamber and within the tool sleeve such that the pole piece is coaxially aligned within the cylindrical core.

It is a feature of the present invention that the annular magnet is easily and accurately assembled into the cylindrical chamber of the core element.

It is another feature of the present invention that the pole piece magnet is accurately positioned and easily assembled into the cylindrical chamber of the core element.

These and other objects, advantages and features of the present invention will become readily apparent to those skilled in the art from a study of the following Description of an Exemplary Preferred Embodiment when read in conjunction with the attached Drawing and appended claims.

DESCRIPTION OF AN EXEMPLARY PREFERRED EMBODIMENT

Figure 1:
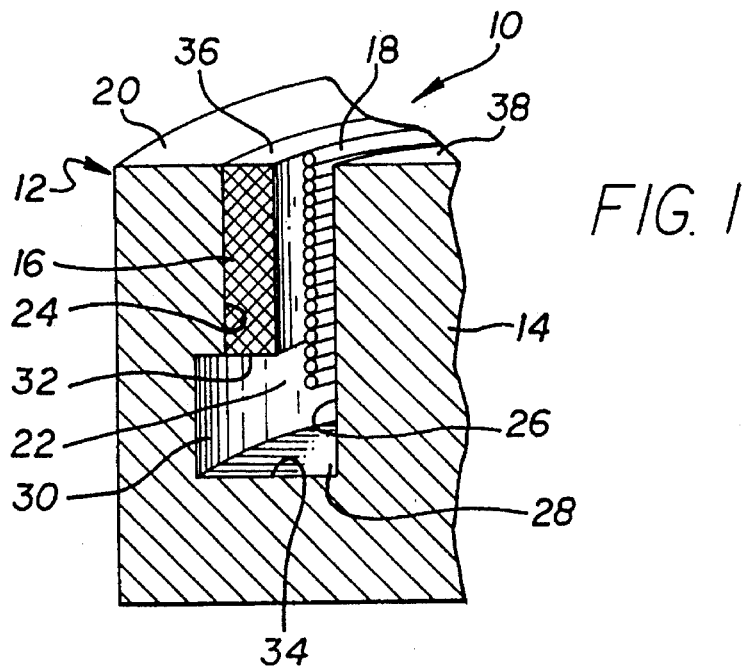
FIG. 1 is a partial cross-sectional view of an actuator assembled according to the method and devices of the present invention.
Figure 4:
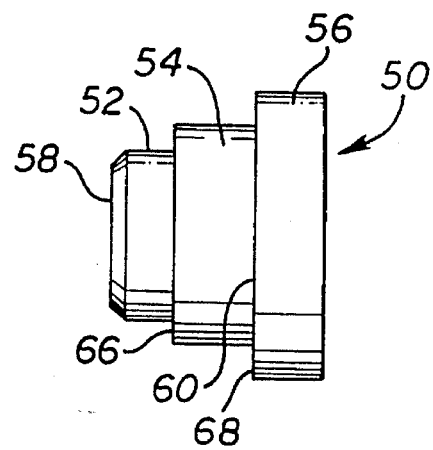
FIG. 4 is a cross sectional view of the magnet assembly device used on the assembly process shown in FIG. 2.

Referring to FIG. 1, there is shown the novel voice coil actuator 10 as described in the Background of the Invention. The improved method of assembling the actuator 10 is now described in detail. The method of assembling the magnet 16 within the chamber 22 of the core 12 is first discussed with reference to FIGS. 2, 4, and 6. FIG. 4 shows a magnet assembly device or tool 50 used for the radial magnet assembly procedure. The magnet assembly tool 50 preferably includes a first portion 52, a second portion 54 and a third portion 56. The first portion 52 has a diameter approximately equal to the diameter of the chamber 22 less two times the radial thickness of the annular magnet 16. The second portion 54 extends from the first portion 52 and is concentric with the first portion 52. The second portion 54 has a diameter approximately equal to the diameter of the chamber 22. The third portion 56 extends from the second portion 54 and is concentric the second portion. The third portion 56 has a diameter greater than the diameter of the chamber 22. In the embodiment of the tool 50 shown in FIG. 2, the combined length of the first and second portions is approximately equal to the length of the chamber 22. These dimensions of the tool 50 allow for easy alignment of the tool 50 within the chamber 22.

Figure 6:
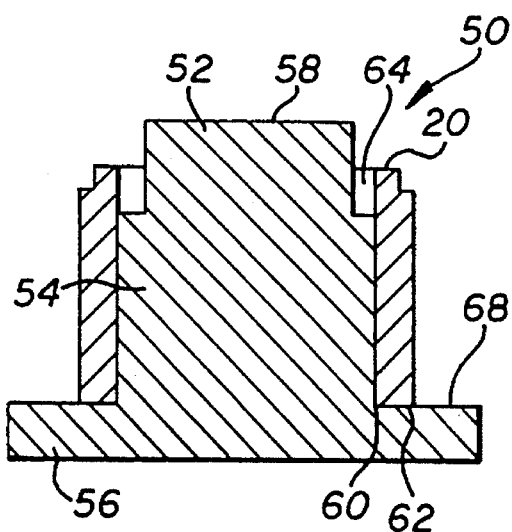
FIG. 6 is a cross-sectional assembly drawing showing an alternative process of assembling the magnet into the chamber of the core.

In the embodiment shown in FIG. 4, the first portion 52 includes an upper surface 58 of the tool. When the tool 50 is inserted in the chamber 22, the first portion upper surface 58 will align with the upper surface 20 of the core, and the lower surface 60 of the second portion 54 will align with the lower surface 62 of the core. However, as shown in FIG. 6, the first portion 52 may be designed such that when the tool is inserted in the chamber, the first portion 52 extends partially above the upper surface 20 of the core. The advantages of each of these two embodiments is discussed herein.

Figure 2:
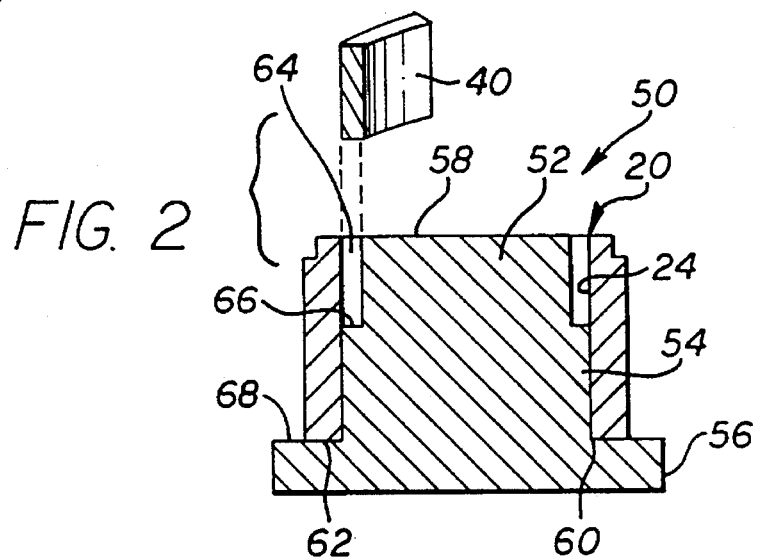
FIG. 2 is a cross-sectional assembly drawing showing the method of assembling the magnet into the chamber of the core.

The method of assembling an annular magnet in the cylindrical core at a predetermined height is now discussed with reference to FIG. 2. First, the magnet assembly tool 50 is inserted into the chamber 22, such that the upper surface 58 of the first portion of the tool aligns with the upper surface 20 of the core, and the lower surface 60 of the second portion aligns with the lower surface 62 of the core. The third portion 56 of the tool serves to prevent the magnet assembly tool from being inserted too far into the chamber. An upper surface 68 of the third portion 56 will contact the lower surface 62 of the core when the tool is properly positioned. When the tool is properly inserted, a gap 64 is formed between the outer wall surface 24 of the chamber and the first portion 52 of the tool. In the embodiment shown in FIG. 2, the upper surface 66 of the second portion coincides with the proper height of the lower edge 32 of the magnet, as previously described herein. The magnet 16, or magnets, are then inserted into the gap 64. A low viscosity adhesive is then applied between the annular magnet and the outer wall surface. The adhesive preferably has a viscosity of 3–10 cp to allow it to flow between the magnet and core. The tool is then removed from the chamber, leaving the magnets secured to the outer wall surface of the chamber.

Alternatively, the magnet assembly device or tool shown in FIG. 6 may be utilized. The second embodiment of the tool shown in FIG. 6 may be preferable when a plurality of the magnet segments are being bonded to the core member, as compared to a single annular magnet. In the tool shown in FIG. 6, the first portion 52 is designed such that when the tool is inserted in the chamber, the first portion 52 extends partially above the upper surface 20 of the core. The combined length of the first and second portions of the tool shown in FIG. 6 is longer than the length of the chamber 22. Therefore, when the magnet assembly tool is inserted into the chamber, the lower surface 60 of the second portion aligns with the lower surface 62 of the core, and the first portion 52 partially extends above the upper surface 20 of the core. Similar to the first embodiment of the tool, the third portion of the tool prevents the tool from being inserted too far into the chamber by the contacting of the third portion upper surface 68 against the lower surface 62 of the core.

The magnets are inserted into the gap 64 between the first portion of the tool and the outer wall of the chamber. The tool is then adjusted downward in the chamber such that the lower surface 60 of the second portion is no longer aligned with the lower surface 62 of the core and the upper surface of the first portion aligns with the upper surface of the core. The magnets are also repositioned downward to their proper predetermined height in the chamber. A low viscosity adhesive is applied between the magnets and the outer wall surface. The tool is then completely removed from the chamber, leaving the magnet segments bonded to the outer wall of the core chamber.

Figure 7:
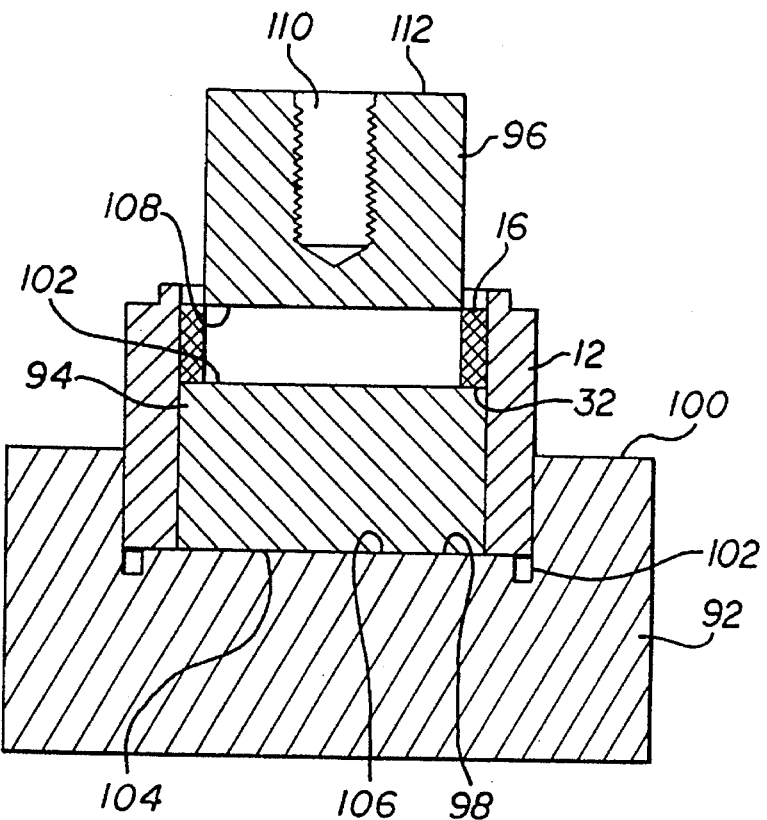
FIG. 7 is a cross-sectional assembly drawing showing a second alternative process of assembling the magnet into the chamber of the core.

Referring now to FIG. 7, an second alternative method of assembling the annular magnet 16 into the chamber 22 of the core 12 is shown. The second alternative method utilizes three tools; an assembly support tool 92, a magnet support tool 94, and a position tool 96. The assembly support tool 92 is an annular shaped member with a substantially U-shaped cross section. The U-shaped cross-section is formed by a cylindrical-shaped cavity 98 in the upper surface 100 of the tool. The cavity 98 further preferably includes at least one groove 102 along the outer circumference of the cavity 98. The cavity 98 is dimensioned to allow the core member 12 to fit into the cavity. The groove 102 serves to facilitate the insertion of the core member into the cavity by reducing air pressure between the core 12 and assembly support tool 92.

After the core member 12 is inserted into the cavity 98 of the assembly support tool 92, the magnet support tool 94 is inserted into the chamber 22 of the core. The magnet support tool 94 is a cylindrical member having a substantially planar upper surface 102 and a substantially planar lower surface 104. The magnet support tool 94 is dimensioned to fit into the chamber 22 of the core element. The magnet support tool 94 is inserted into the chamber such that the lower surface 104 of the magnet support tool is in contact with a lower surface 106 of the cavity 98 of the assembly support tool. The magnet support tool is dimensioned such that the upper surface 102 of the tool is at the proper predetermined height for the magnet 16 when the lower surface 104 of the tool is in contact with the lower surface 106 of the cavity.

The magnet 16 is then inserted into the chamber 22 such that the magnet lower edge 32 is in contact with the upper surface 102 of the magnet support tool. The magnet position tool 96 is then inserted into the center of the annular magnet 16. The magnet position tool 96 is a cylindrical shaped member having a outer diameter approximately equal to the inner diameter of the annular magnet. The tool 96 has a substantially planar lower surface 108 and includes a bore 110 in the upper surface 112 of the tool. When the position tool 96 is inserted into the center of the magnet, the magnet is forced into its proper position, and the entire circumference of the magnet is in contact with or in close relation to the outer wall surface of the chamber. The adhesive is then applied between the magnet and the outer wall of the chamber, and the tools are removed.

Figure 5:
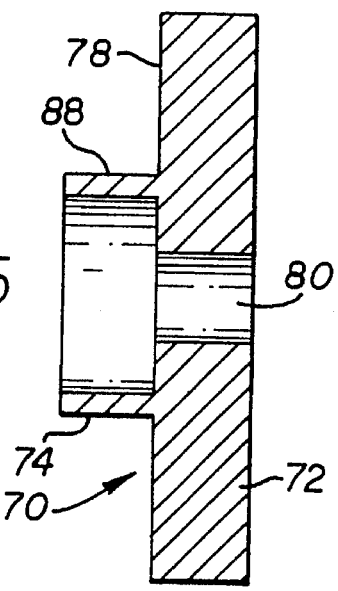
FIG. 5 is a cross sectional view of the pole piece assembly device used in the assembly process shown in FIG. 3.

After the magnets 16 are bonded to the outer wall 24 of the core chamber, the pole piece 14 is axially aligned within the chamber 22 and assembled to the core element 12. The method of axially aligning the pole piece 14 within the core chamber 22 is now discussed with reference to FIGS. 3 and 5. FIG. 5 shows a pole piece assembly device or tool 70 used for the pole piece assembly procedure. The pole piece assembly tool 70 preferably includes a head portion 72 and an annular sleeve 74. The head portion 72 is a circular shaped member having a substantially flat upper surface 76 and lower surface 78. The diameter of the head portion 72 is larger than the diameter of the chamber 22. The annular sleeve 74 is preferably axially aligned with the head portion 72 and extends downward from the lower surface 78 of the head portion. The sleeve 74 has a radius equal to the radius of the chamber 22 less the radial thickness of the magnet 16. The head portion 72 also defines an axially oriented aperture 80 in the approximate center of the head portion to allow air flow through the head portion.

Figure 3:
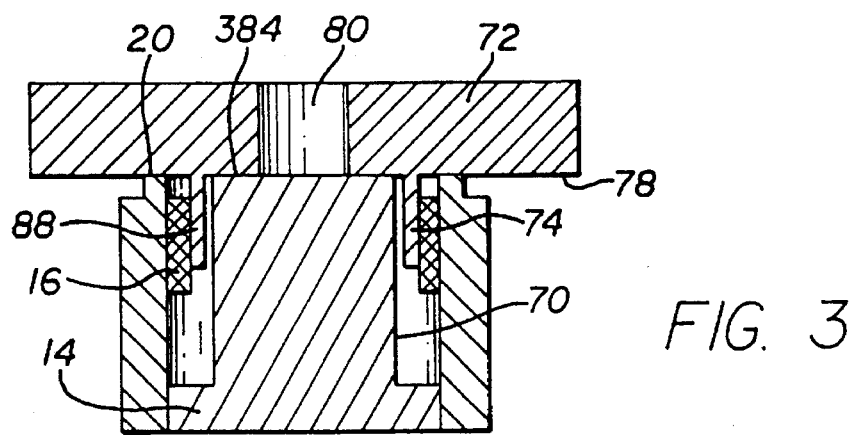
FIG. 3 is a cross-sectional assembly drawing showing the method of assembling the pole piece into the chamber of the core.

The method of assembling the pole piece 14 in axial alignment with the chamber 22 is now discussed with reference to FIGS. 3 and 5. First, the annular sleeve 74 of the tool 70 is inserted into the chamber 22 such that the outer surface 88 of the annular sleeve is in contact with the magnet 16 and the lower surface 78 of the head portion of the tool abuts the upper surface 20 of the core. The pole piece 14 is then inserted into the chamber 22 such that the outer surface 82 of the pole piece is disposed within the sleeve 74 of the tool, and the upper surface 38 of the pole piece abuts against the lower surface 78 of the head portion of the tool. This method of assembly causes the pole piece to be coaxially aligned with the cylindrical core. The pole piece assembly tool 70 is then removed.

Figure 8:
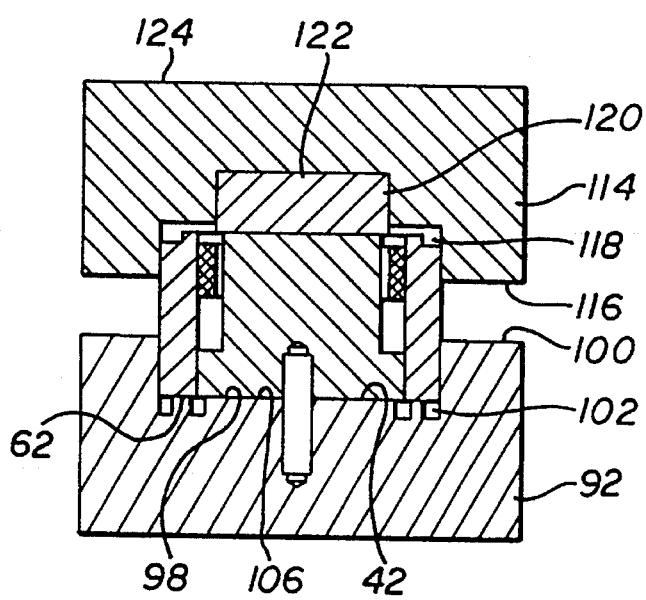
FIG. 8 is a cross-sectional assembly drawing showing an alternative process of assembling the pole piece into the chamber of the core.

Referring now to FIG. 8, an alternative method of assembling the pole piece 14 into the chamber of the core element is shown. The alternative assembly method shown in FIG. 8 requires two tools; the assembly support tool 92 and a pole insert tool 114. The assembly support tool 92 was previously described herein with reference to FIG. 7.

The pole piece 14 is inserted upwardly into the chamber 22 of the core element, so as to not disturb the magnets. The adhesive is applied between the contacting portions of the pole piece and the core element. The core element is then inserted into the cavity 98 of the assembly support tool 92 such that the lower surface 42 of the pole piece and the lower surface 62 of the core element are in contact with the lower surface 106 of the cavity 98.

The pole insert tool 114 is a cylindrical member having two concentric cavities 118, 120 in a lower surface 116 of the tool. The first cavity 118 has a diameter approximately equal to the outer diameter of the core member. The second cavity 120 has a diameter larger than the diameter of the upper portion 44 of the pole piece 14, yet smaller than the diameter of the core chamber 22. A rubber ring 122 is placed into the second cavity 120, and the pole insert tool is positioned over the upper surface 20 of the core element such that the core member partially fits into the first cavity 118. Force is applied to an upper surface 124 of the pole insert tool, forcing the pole piece into proper axial alignment within the chamber. The pole insert tool 114 and assembly support tool 92 are then removed from the core element.

An application of the novel voice coil actuator 10 is in a speaker. The speaker includes a speaker cone mechanically connected to the coil through a carrier, and a resilient expandable member (known as a spider) attachable to each of the core and the coil to suspend the coil in its zero current bias position. The arrangement of the cone and resilient member are well known. The core may include an annular mounting flange to which a conventional basket may be mounted. The resilient member is conventionally attached to the carrier and the basket.

There has been described hereinabove an exemplary preferred embodiment of a method and devices for assembling a radially magnetized voice coil actuator. Those skilled in the art may now make numerous uses of and departures from the above described inventive concepts without departing from the inventive concepts disclosed herein. Accordingly, the present invention is to be defined solely by the scope of the following claims.

We claim:

1. A method of assembling an annular magnet having a predetermined radial thickness and a lower edge into a cylindrical core such that the magnet lower edge is at a predetermined height of the core comprising the steps of:

providing a cylindrical core having a chamber with an outer wall surface defining a chamber diameter;

inserting a device into the chamber, said device having a first portion with a first diameter approximately equal to the chamber diameter less two times the radial thickness of the annular magnet, and a second portion having an upper surface and a second diameter approximately equal to the chamber diameter, wherein a gap is formed between the outer wall surface and the first portion and said second portion upper surface is level with the predetermined height of the core;

inserting the annular magnet into the gap such that the magnet lover edge contacts the second portion upper surface, and such that the magnet adheres to the outer wall surface; and removing the device from the chamber.

2. A method of assembling an annular magnet into a cylindrical core in accordance with claim 1 further comprising the step of:

aligning a top surface of the first portion of the device with an upper edge of the chamber before inserting the magnet.

3. A method of assembling an annular magnet into a cylindrical core in accordance with claim 1 further comprising the step of:

aligning a lower surface of the second portion of the device with a lower edge of the chamber before inserting the magnet.

4. A method of assembling an annular magnet into a cylindrical core in accordance with claim 1 further comprising the step of applying an adhesive between the magnet and the outer wall surface to cause the magnet to adhere to the outer wall surface.

5. A method of assembling an annular magnet having a predetermined radial thickness and a lower edge into a cylindrical core such that the magnet lower edge is at a predetermined height of the core comprising the steps of:

providing a cylindrical core having a chamber with an outer wall surface defining a chamber diameter;

inserting a device into the chamber, said device having a first portion having a diameter approximately equal to the chamber diameter less two times the radial thickness of the magnet, a second portion having an upper surface and a second diameter approximately equal to the chamber diameter, and a third portion having a diameter greater than the chamber diameter, wherein a gap is formed between the outer wall surface of the chamber and the first portion of the device and said second portion upper surface is level with the predetermined height of the core;

abutting a top surface of the third portion of the device against a lower edge of the chamber;

inserting the magnet into the gap between the chamber outer wall surface and the first portion of the device such that the magnet lower edge contacts the second portion upper surface;

adhering the magnet to the outer wall surface; and removing the device from the chamber.

6. A method of assembling an annular magnet into a cylindrical core at a predetermined height in accordance with claim 5 further comprising the step of:

inserting a device into the chamber such that the first portion extends partially above an upper edge of the chamber before inserting the magnet into the gap.

7. A method of assembling an annular magnet into a cylindrical core at a predetermined height in accordance with claim 6 further comprising the step of:

lowering the device within the chamber such that a top surface of the first portion aligns with the upper edge of the chamber after the magnet is inserted into the gap; and readjusting the magnet downward to its predetermined height within the chamber before adhering the magnets to the outer wall surface.

8. A method of assembling an annular magnet into a cylindrical core in accordance with claim 5 further comprising the step of applying an adhesive between the magnet and the outer wall surface to cause the magnet to adhere to the outer wall surface.

9. A method of assembling an annular magnet into a cylindrical core in accordance with claim 5 wherein the step of inserting the magnet into the gap further includes inserting a plurality of magnet segments that form the annular shaped magnet into the gap.

10. A method of coaxially aligning a cylindrical pole piece within a hollow cylindrical core comprising the steps of:

providing a cylindrical core having a chamber with an outer wall surface and an annular magnet secured to the outer wall;

providing a device having a head with a substantially planar lower surface and an annular sleeve extending from the head lower surface;

inserting the annular sleeve of the device in the chamber such that the annular sleeve is in contact with the magnet and the head lower surface abuts the upper edge of the chamber, and inserting the pole piece within the sleeve in the chamber such that the pole piece is coaxially aligned within the cylindrical core.

* * * * *